Figure 1:
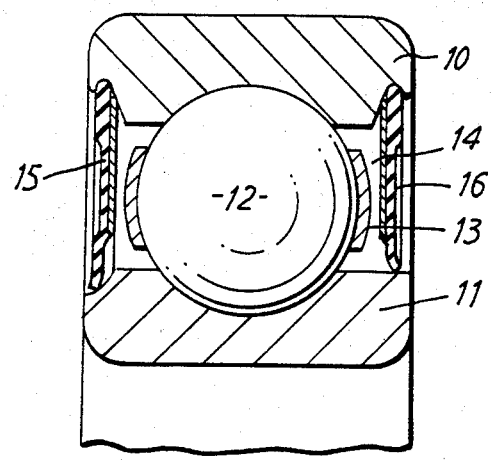

United States Patent [19]

Woodbridge

[11] Patent Number: 4,533,265

[45] Date of Patent: Aug. 6, 1985

[54] ROLLING BEARING ASSEMBLIES FITTED WITH SEALS

[75] Inventor: Keith W. Woodbridge, Luton, England

[73] Assignee: SKF (U.K.) Limited, Luton, England

[21] Appl. No.: 464,488

[22] Filed: Feb. 7, 1983

[30] Foreign Application Priority Data

Feb. 9, 1982 [GB] United Kingdom ............... 8203651

[51] Int. Cl.³ .............................................. F16C 33/78
[52] U.S. Cl. ................................... 384/477; 384/482; 384/484; 277/29; 277/50
[58] Field of Search .................... 308/187.1, 187.2; 384/130, 147, 151; 277/3, 29, 27, 35, 37, 50, 70, 71, 166

[56] References Cited

U.S. PATENT DOCUMENTS

| | | | |
|---|---|---|---|
| 2,559,857 | 7/1951 | Edwards | 403/134 |
| 3,208,779 | 9/1965 | Sullivan, Jr. | 277/29 X |
| 3,314,735 | 4/1967 | Kocian | 308/187.2 |
| 3,361,497 | 1/1968 | Stengel | 308/187.2 |
| 3,473,856 | 10/1969 | Helms | 308/187.2 |
| 3,869,181 | 3/1975 | Barber | 308/187.2 |

*Primary Examiner*—Stuart S. Levy
*Assistant Examiner*—David Werner
*Attorney, Agent, or Firm*—Browdy and Neimark

[57] ABSTRACT

A rolling bearing assembly fitted with seals for a bearing chamber between two relatively rotatable components of the assembly. Each seal is mounted on one of the components and has a resilient sealing lip in sliding contact with a sealing surface on the other component, the lip being deflected by the sealing surface in a direction away from the bearing chamber under normal running conditions. The side of the lip facing the chamber is formed with grooves arranged to permit air to flow past the seal in the event of the lip being drawn inwardly towards the bearing chamber by a reduced pressure therein. The side of the lip may be provided with ribs instead of grooves.

10 Claims, 20 Drawing Figures

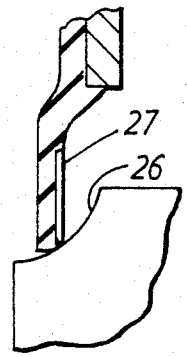 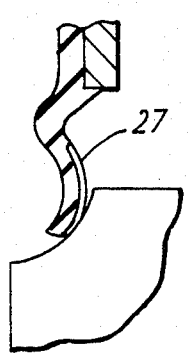 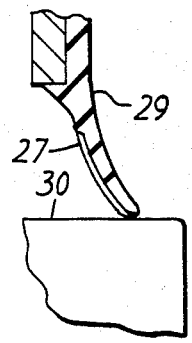 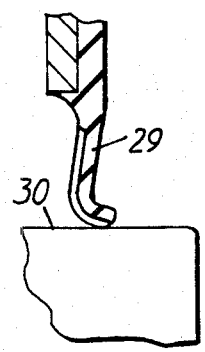
FIG.4a  FIG.5a  FIG.6a  FIG.7a
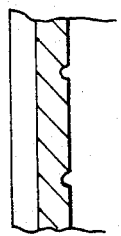 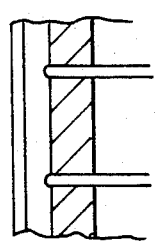 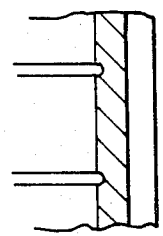 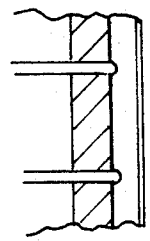
FIG.4b  FIG.5b  FIG.6b  FIG.7b
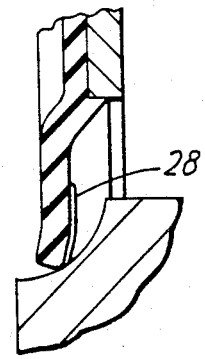
FIG.8

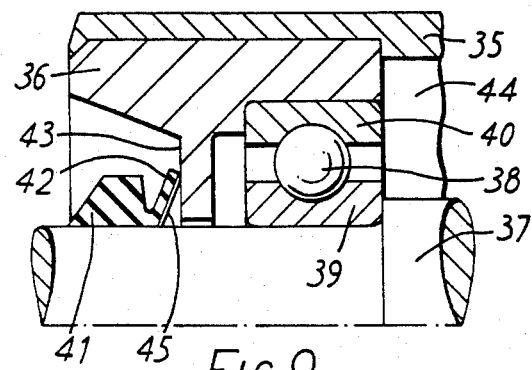
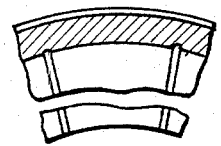
FIG.9a
FIG.9b
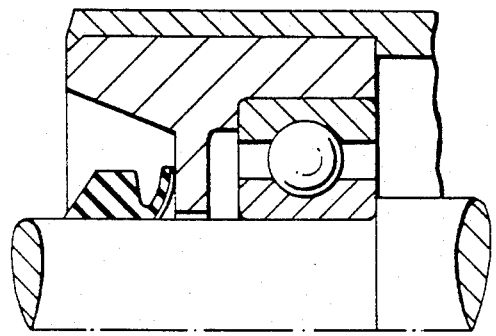
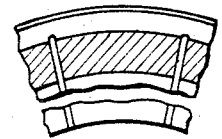
FIG.10a
FIG.10b

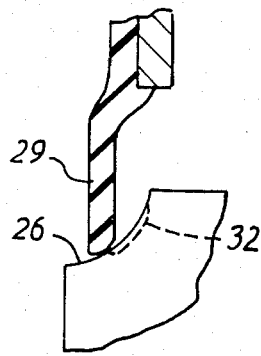
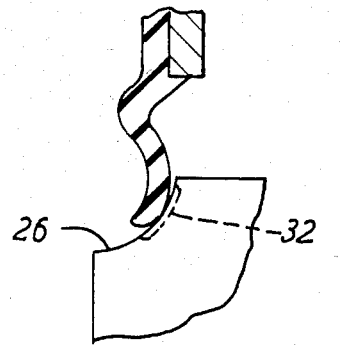
FIG.11a  FIG.12a
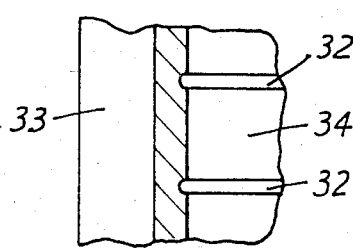
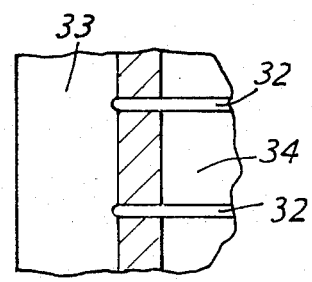
FIG.11b  FIG.12b

ROLLING BEARING ASSEMBLIES FITTED WITH SEALS

This invention relates to rolling bearing assemblies.

A rolling bearing assembly, that is a device or machine having a bearing formed of bodies arranged to roll around circular tracks in the device or machine, is generally provided with seals to retain lubricant and prevent entry of foreign matter, the seals co-operating with the bearing rings or other components of the machine to form a closed chamber containing the rolling bodies. Seals are conventionally designed to provide a designed level of sealing pressure between the sealing lip and sealing surface. This is arranged in various ways, so that an axial force or a radial force occurs between the sealing lip and a sealing surface. It is usual but not essential that the sealing force in axial biased seals acts towards the sealed chamber.

Power driven machines which include rolling bearings are usually fitted with seals having flexible sealing lips designed to provide the minimum sealing pressure against the sealing surfaces which would provide adequate sealing, in order to reduce to a minimum the frictional torque caused by the sliding contact between the lips and the sealing surfaces. Such machines are sometimes difficult to start, and it was believed hitherto that this was due to a malfunction of the bearing arrangement or failure of the bearing lubricant causing frictional torque high enough to prevent operation of the machine.

The present invention arose from the discovery that difficulty in starting power driven machines due to frictional torque, in general only arises after the machine has been running for a period of time and is due to pressure differences across the seals increasing the sealing pressure between the sealing lips and sealing surfaces. It is believed that, when the machine has been running for a period of time, the air pressure in the closed chamber containing the rolling bodies increases, due to expansion of the air as a result of heat generated by friction forces, to a level at which the force exerted by the increased air pressure on the seals exceeds the sealing force between the seals and the sealing surfaces on the machines. The sealing lips are then deflected away from their sealing surfaces and allow air in the chamber to vent to atmosphere which is at a lower pressure. When however the machine is stopped, the air in the closed chamber cools and reduces in pressure to a level below that of the surrounding atmospheric pressure. There is then a pressure difference across the seals which increases the sealing pressure to a level which prevents or greatly resists rotation of the machine under its own power.

According to the present invention there is provided a rolling bearing assembly comprising a rotary component rotatably supported on another component of the assembly by a plurality of rolling bodies in a bearing chamber defined between the two components, and an annular seal for the chamber, the seal being mounted on one of the components and having a resilient sealing lip which is deflected by engagement with the other component in a direction away from the bearing chamber, the sealing lip under normal running conditions being in sliding sealing contact with a sealing surface on the other component, wherein the sealing lip is deformable into a position out of sealing contact with said sealing surface in response to pressure difference across the seal due to reduction of the pressure within the chamber to a value below that outside the chamber, to permit entry of air or fluid into the chamber.

In the rolling bearing assembly of the invention, the seal provides effective sealing during operation but does not produce high sealing pressure in subsequent start-up of the bearing assembly. Part of the sealing lip can conveniently be formed with one or more grooves, the lip being deformable in response to the above mentioned pressure difference to bring said part into contact with the sealing surface so that the groove or grooves permit flow of air or fluid past the seal. Alternatively, part of the sealing lip can be formed with one or more protrusions, the lip being deformable in response to the above mentioned pressure difference to bring the protrusions into contact with the sealing surface, the protrusions spacing the remainder of said part of the sealing lip from the sealing surface to permit flow of air or fluid past the seal.

Instead of the sealing lip being provided with grooves or protrusions, the component having the sealing surface may be provided with a non-sealing surface adjacent the sealing surface, the lip being deformable in response to the above mentioned pressure difference to a position in which it is out of sliding contact with the sealing surface and in sliding contact with the non-sealing surface. The non-sealing surface may be formed with one or more grooves to permit passage of air or fluid between the sealing lip and the non-sealing surface when in contact therewith.

Figures 2, 3:
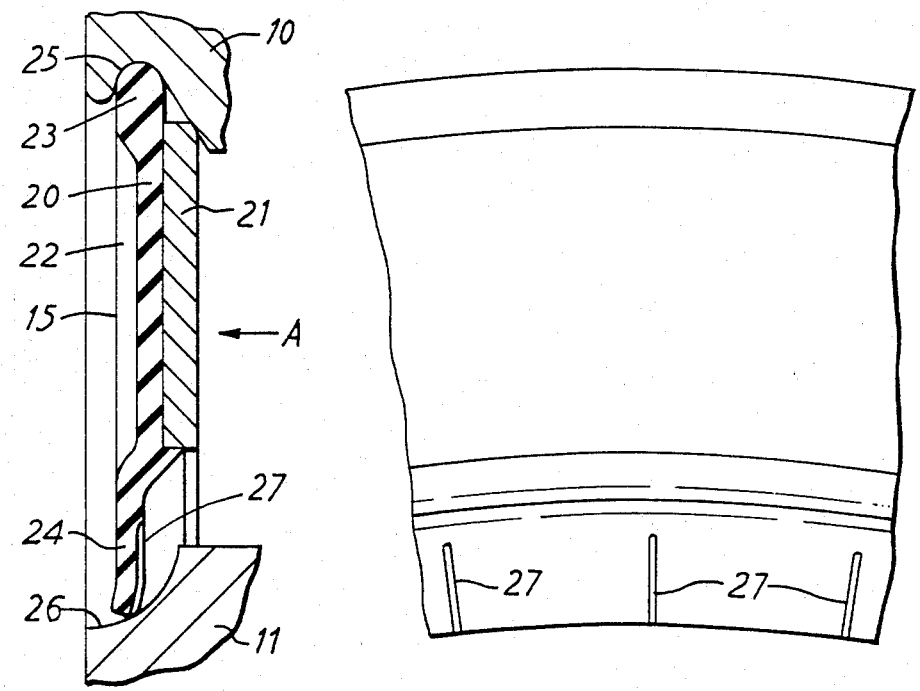

Embodiments of the invention will now be described, by way of example, with reference to the accompanying drawings in which like parts are denoted by like reference numerals, and in which:

FIG. 1 is an axial section of a ball bearing fitted with an axial seal and a land riding seal, FIG. 2 is an axial section on a larger scale of part of the ball bearing of FIG. 1, showing the axial seal and the contact surfaces of the axial seal on the bearing rings, FIG. 3 is a back view of part of the seal shown in FIG. 2, taken in the direction of the arrow A in FIG. 2, FIG. 4a illustrates the position of the lip of the axial seal on the sealing surface on the inner bearing ring under normal running conditions, FIG. 4b is a view of the underside of the lip of the axial seal of FIG. 4a on a larger scale and showing in cross hatching the area of contact of the lip with the sealing surface, FIG. 5a illustrates the position of the lip of the axial seal on the sealing surface on the inner bearing ring when the interior of the bearing is at a lower pressure than the external atmospheric pressure, FIG. 5b is a view of the underside of the lip of the axial seal of FIG. 5a on a larger scale and showing in cross hatching the area of contact of the lip with the sealing surface, FIG. 6a illustrates the position of the lip of the land riding seal on the sealing surface on the inner bearing ring under normal running conditions, FIG. 6b is a view of the underside of the lip of the land riding seal of FIG. 6a on a larger scale and showing in cross hatching the area of contact of the lip with the sealing surface, FIG. 7a illustrates the position of the lip of the land riding seal on the sealing surface on the inner bearing ring when the interior of the bearing is at a lower pressure than the external atmospheric pressure, FIG. 7b is a view of the underside of the lip of the land riding seal of FIG. 7a on a larger scale and showing in cross hatching the area of contact of the lip with the sealing surface, FIG. 8 is an axial section of the lip of another construction of axial seal, and part of the inner bearing ring showing the associated sealing surface, FIG. 9a is an axial section of part of a bearing assembly having a shaft fitted with a V-ring seal, under normal running conditions, FIG. 9b is an end view of the lip of the V-ring seal of FIG. 9a on a larger scale and showing in cross hatching the area of contact of the lip with the sealing surface, FIG. 10a is an axial section of the part of the bearing assembly of FIG. 9a showing the position of the lip of the V-ring seal on its sealing surface when the bearing chamber in the assembly is at a lower pressure than the external atmospheric pressure, FIG. 10b is an end view of the lip of the V-ring seal of FIG. 10a on a larger scale and showing in cross hatching the area of contact of the lip with the sealing surface.

FIG. 11a shows the lip of another construction of axial seal and the annular surface on the inner bearing ring in sliding contact with the lip, the lip being shown in the position taken up under normal running conditions, FIG. 11b is a plan view of part of the annular surface on the inner bearing ring of FIG. 11a, on a larger scale, and showing in cross hatching the area of contact between the lip and the annular surface on the inner bearing ring when the lip is in the position shown in FIG. 11a.

FIG. 12a shows the position of the lip of the axial seal of FIG. 11a on the annular surface on the inner bearing ring when the interior of the bearing is at a lower pressure than the external atmospheric pressure, and FIG. 12b is a plan view of part of the annular surface on the inner bearing ring of FIG. 12a, on a larger scale, and showing in cross hatching the area of contact between the lip and the annular surface on the inner bearing ring when the lip is in the position shown in FIG. 12a.

The rolling bearing assembly shown in FIG. 1 is a single row deep groove ball bearing comprising an outer bearing ring 10, an inner bearing ring 11, a plurality of balls 12 arranged between the two bearing rings and in rolling engagement with raceways thereon, and a cage 13 which holds the balls in spaced relationship around the bearing rings. The annular bearing chamber 14 formed between the two bearing rings 10, 11 is closed at one axial end by an axial seal 15 and at the other axial end by a land riding seal 16, the seals 15, 16 retaining lubricant within the bearing chamber and preventing entry of foreign matter into the chamber. The seals in a bearing assembly would of course normally be of the same type and two types of seal 15 and 16 are shown in the one bearing assembly only for convenience in describing the invention as applied to bearing assemblies fitted with such seals.

The axial seal 15 comprises an annular disc-like member 20 of rubber or like resilient material, and an annular reinforcing member 21 of metal or other rigid material bonded to the centre portion of the annular member 20. As shown in FIG. 2 the centre portion of the resilient member 20 between its inner and outer peripheries is recessed at 22 on the side remote from the member 21 so that its outer periphery 23 has a thick bulbuous shape.

The inner periphery of the resilient member 20 has substantially the same thickness as the centre portion thereof but is offset axially outwards on the side remote from the member 21 to form a relatively thin resilient sealing lip 24. The seal 15 is arranged with the reinforcing member 21 facing axially inwards, and the seal is located by engagement of its outer periphery 23 as a force fit in an annular groove 25 on the inside surface of the outer bearing ring, so that the seal is fast with the outer bearing ring. The sealing lip 24 is in sliding contact with an annular sealing surface 26 on the inner bearing ring, the surface 26 having a curved outline in axial section as shown in FIG. 2 with the radially outer portion of the surface 26 facing axially outwards and the radially inner portion facing radially outwards. The arrangement is such that, when the pressure in the bearing chamber 14 is equal to the external atmospheric pressure, the lip 24 is deflected axially outwards against its own resilient resistance to deformation by contact of the lip with the sealing surface 26 so as to provide sealing pressure between the lip and the sealing surface 26.

In accordance with the present invention, the back surface of the sealing lip 24, that is the surface facing radially inwards towards the bearing chamber 14, is provided with radial grooves 27 spaced at equal intervals around the periphery of the lip. Under normal running conditions in which the pressure in the bearing chamber 14 is substantially the same as the external atmospheric pressure the seal remains in the position shown in FIG. 4a in which the tip of the sealing lip is in contact with the sealing surface 26 around the full periphery of the sealing surface. This is seen in FIG. 4b in which the cross-hatched portion represents the area of contact between the lip 24 and the sealing surface 26. It will be observed that the cross-hatched portion is not interrupted by the grooves 27. When however the air in the bearing chamber 14 becomes hot and expands due to continuous running of the bearing, the increased pressure forces the lip 24 away from the sealing surface 26 and allows air to vent from the chamber. Subsequent cooling of the air in the bearing chamber, after running of the bearing has ceased, causes a reduction in the pressure in the chamber to a value below that of the external atmospheric pressure. In these conditions the pressure difference across the seal causes the sealing lip 24 to be drawn inwards and deform as shown in FIG. 5a so that the grooved back surface of the sealing lip 24 lies along the sealing surface 26. As will be seen from FIG. 5b the area of contact between the lip and the sealing surface represented by cross-hatching is then interrupted by the grooves 27, that is the grooves provide connections between the bearing chamber 14 and the external atmosphere, so that air flows through the grooves and into the chamber to equalise the pressures across the seal. The sealing lip then returns to the normal running position shown in FIG. 4a in which the bearing chamber is again sealed.

The grooves 27 can conveniently be small and approximate to 0.005 inches deep. One groove would be sufficient to equalise the pressures across the seal, but the sealing lip is preferably provided with a number of grooves as shown in FIG. 3 in case any of the grooves should be blocked by lubricant or debris from seal wear.

Instead of providing the sealing lip with grooves 27, the back surface of the lip may be provided with protrusions, for example radially extending ribs 28 as shown in FIG. 8. In the event of the lip being drawn inwardly against the sealing surface 26 due to reduced pressure in the bearing chamber 14, the ribs 28 hold the parts of the lip between the ribs spaced from the sealing surface and allow air to flow into the chamber.

The land riding seal 16 in the ball bearing of FIG. 1 is similar in construction to that of the axial seal 15, except that the sealing lip 29 of the land seal is not offset axially outwards as in the lip of the axial seal but is curved axially outwards and is in sliding contact with a cylindrical sealing surface 30 on the inner bearing ring. The back surface of the sealing lip 29 is provided with radially extending grooves 27 similar to the grooves formed on the sealing lip of the axial seal and, as shown in FIG. 6a the grooves do not interrupt the cross-hatched area of contact between the lip 29 and the sealing surface 30. In the event however of the lip 29 being drawn axially inwards due to reduced pressure in the bearing chamber 14, the lip will be drawn into the space between the reinforcing member 21 of the seal and the sealing surface 30 so as to deform the lip as shown in FIG. 7a. The grooves 27 will then be open to the outside atmosphere and allow air to enter the bearing chamber. The grooves 27 on the sealing lip 29 could of course be replaced by ribs 28.

Instead of providing grooves 27 or ribs 28 on the sealing lip, the annular portion of the surface 26 which is in contact with the lip when deformed may be provided with axial grooves 32 arranged to permit passage of air past the lip, as shown in FIG. 12a. The surface 26 on the inner bearing ring then has an annular sealing portion 33 which is engaged by the lip 29 under normal running conditions, and an annular non-sealing portion 34 formed with the axial grooves 32, the portion 34 being adjacent to and positioned inboard of the sealing portion 33. FIG. 11b shows in cross hatching the area of contact between the lip and the surface 26 under normal running conditions, and FIG. 12b shows in cross hatching the area of contact between the lip and the surface 26 when the lip is drawn inwardly due to reduced pressure in the bearing chamber. It will be noted that the grooves 32 extend across the cross hatched portion in FIG. 12b.

The bearing assembly shown in FIG. 9a comprises an external casing 35 fitted internally with a bearing housing 36, and a shaft 37 having one end rotatably mounted in the housing by a ball bearing 38 having the inner bearing ring 39 mounted on the shaft and the outer bearing ring 40 mounted in the housing 36. The shaft is fitted with a V-ring seal 41 having a sealing lip 42 which is in sliding contact with a radial sealing surface 43 on the housing. The other end of the shaft is supported similarly by another ball bearing (not shown) mounted in a housing in the external casing. The annular chamber between the housings 36 at opposite ends of the shaft forms a bearing chamber 44 containing the ball bearings. The side surface of the sealing lip 42 adjacent the sealing surface 43 is formed with radially extending grooves 45, but the area of contact between the sealing lip 42 and the sealing surface 43, represented by crosshatching in FIG. 9b, is not interrupted by the grooves under normal running conditions when there is little or no pressure difference across the seals. In the event however of the pressure in the bearing chamber 44 being below the external atmospheric pressure, the pressure difference across the seal will cause the lip 42 to deform as shown in FIG. 10a with the grooves 45 extending across the area of contact between the sealing lip and the surface 43 as shown in FIG. 10b. Air will then flow through the grooves 45 and into the bearing chamber 44.

I claim:

1. A rolling bearing assembly comprising a rotary component rotatably supported on another component of the assembly by a plurality of rolling bodies in an annular bearing chamber defined between the two components, and two annular seals disposed one at each end of the annular bearing chamber, each seal being mounted on one of the components and having a resilient sealing lip which is deflected by engagement with the other component in a direction away from the bearing chamber, the sealing lip under normal running conditions being in sliding sealing contact with a sealing surface on the other component, wherein part of each sealing lip is formed with one or more grooves, ribs or protrusions, and the sealing lip is deformable to bring said part thereof into contact with the associated sealing surface in response to pressure difference across the seal due to reduction of the pressure within the chamber to a value below that outside the chamber so that the grooves, ribs or protrusions permit flow of air or fluid past the seal.

2. A rolling bearing assembly as claimed in claim 1, wherein at least one of the annular sealing surfaces for said seals has a curved concave outline in axial section and arranged so that the associated sealing lip is deflected axially outwards in a direction away from the bearing chamber against its own resilient resistance to deformation by contact of the lip with the sealing surface, the back surface of the sealing lip facing the bearing chamber being formed with said one or more grooves, ribs or protrusions.

3. A rolling bearing assembly as claimed in claim 1 wherein at least one of the annular sealing surfaces for said seals is cylindrical, and the associated sealing lip is curved axially outwards in a direction away from the bearing chamber against its own resilient resistance to deformation by contact with the sealing surface, the back surface of the sealing lip facing the bearing chamber being formed with said one or more grooves, ribs or protrusions.

4. A rolling bearing assembly comprising a rotary component rotatably supported on another component of the assembly by a plurality of rolling bodies in a bearing chamber defined between the two components, and an annular seal for the chamber, the seal being mounted on one of the components and having a resilient sealing lip in engagement with the other component, said other component having an annular sealing surface and the sealing lip under normal running conditions being in sliding sealing contact with said sealing surface on the other component, wherein the sealing lip is deflected by engagement with said annular sealing surface in a direction away from the bearing chamber whereby any pressure difference across the seal due to reduction of the pressure within the chamber to a value below that outside the chamber draws the sealing lip inwardly towards the bearing chamber, part of the sealing lip is formed with one or more grooves, and the sealing lip is deformable in response to said pressure difference to bring said part thereof into contact with the sealing surface so that said groove or grooves permit flow of air or fluid past the seal and into the chamber.

5. A rolling bearing assembly comprising a rotary component rotatably supported on another component of the assembly by a plurality of rolling bodies in a bearing chamber defined between the two components, and an annular seal for the chamber, the seal being mounted on one of the components and having a resilient sealing lip in engagement with the other component, said other component having an annular sealing surface and the sealing lip under normal running conditions being in sliding sealing contact with said sealing surface on the other component, wherein the sealing lip is deflected by engagement with said annular sealing surface in a direction away from the bearing chamber whereby any pressure difference across the seal due to reduction of the pressure within the chamber to a value below that outside the chamber draws the sealing lip inwardly towards the bearing chamber, part of the sealing lip is formed with one or more protrusions, and the sealing lip is deformable in response to said pressure difference to bring one or more of said protrusions into contact with said sealing surface so that the protrusion or protrusions space the remainder of the sealing lip from the sealing surface and permit flow of air or fluid past the seal and into the chamber.

6. A rolling bearing assembly comprising a rotary component rotatably supported on another component of the assembly by a plurality of rolling bodies in a bearing chamber defined between the two components, and an annular seal for the chamber, the seal being mounted on one of the components and having a resilient sealing lip in engagement with the other component, said other component having an annular sealing surface and the sealing lip under normal running conditions being in sliding sealing contact with said sealing surface on the other component, wherein the sealing lip is deflected by engagement with said annular sealing surface in a direction away from the bearing chamber whereby any pressure difference across the seal due to reduction of the pressure within the chamber to a value below that outside the chamber draws the sealing lip inwardly towards the bearing chamber, the said other component has a non-sealing surface adjacent said sealing surface and on the inboard side thereof, and the sealing lip is deformable in response to said pressure difference to a position in which the sealing lip is out of sliding contact with said sealing surface and in sliding contact with said non-sealing surface to permit entry of air or fluid into the chamber.

7. A rolling bearing assembly comprising a rotary component rotatably supported on another component of the assembly by a plurality of rolling bodies in a bearing chamber defined between the two components, and an annular seal for the chamber, the seal being mounted on one of the components and having a resilient sealing lip in engagement with the other component, said other component having an annular sealing surface and the sealing lip under normal running conditions being in sliding sealing contact with said sealing surface on the other component, wherein the sealing lip is deflected by engagement with said annular sealing surface in a direction away from the bearing chamber whereby any pressure difference across the seal due to reduction of the pressure within the chamber to a value below that outside the chamber draws the sealing lip inwardly towards the bearing chamber, and the sealing lip is deformable in response to said pressure difference into a position out of sealing contact with said sealing surface, and the sealing lip is provided with means which permit entry of air or fluid into the chamber upon deformation of the sealing lip into said position out of sealing contact with the sealing surface.

8. A rolling bearing assembly as claimed in claim 6, wherein said non-sealing surface is formed with one or more grooves to permit passage of air or fluid between the sealing lip and the non-sealing surface when the sealing lip is in contact therewith.

9. A rolling bearing assembly as claimed in claim 8, 4 or 5, wherein the or each groove or protrusion is of small depth or height, for example within the range 0.1 mm to 1.0 mm.

10. A rolling bearing assembly as claimed in claim 7, wherein the seal comprises an annular disc-like member of rubber or like resilient material and an annular reinforcing member of rigid material bonded to the center portion of the annular member of resilient material, one of the peripheral margins of the annular member of resilient material forming the sealing lip.

* * * * *